3,361,739
LINCOMYCIN DERIVATIVES AND PROCESSES
FOR PREPARING THE SAME
Alexander D. Arquodelis and Fred Kagan, Kalamazoo,
Mich., assignors to The Upjohn Company, Kalamazoo,
Mich., a corporation of Delaware
No Drawing. Filed July 18, 1966, Ser. No. 565,730
3 Claims. (Cl. 260—210)

ABSTRACT OF THE DISCLOSURE

Lincomycin analogs having the structural formula:

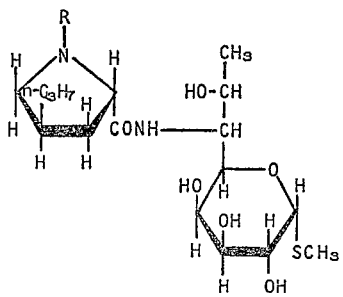

wherein R is a member of the group consisting of alkyl of at least two carbon atoms, cycloalkyl and aralkyl and the acid addition salts thereof. Compounds can be prepared by contacting N-dimethyllincomycin with an alkyl iodide. N-ethyllincomycin D, a compound of the invention, can be used for the same purposes as lincomycin and, also, to inhibit Gram-negative bacteria.

---

This is a continuation-in-part application of copending application Ser. No. 379,734, filed July 1, 1964, and now abandoned.

This invention relates to novel processes and to novel products produced thereby. It is particularly directed to novel processes for converting lincomycin D to lincomycin and to novel analogues of lincomycin.

Lincomycin D (U-11,973E) is an antibiotic obtained as an elaboration product of a lincomycin-producing actinomycete when methyl thiolincosaminide (MTL) is added to the fermentation. Methods for the production, recovery and purification of lincomycin D (U-11,973E) are described hereinafter.

It has now been found that lincomycin D can be converted to lincomycin by methylation. From this and other evidence it has been deduced that lincomycin D is N-demethyllicomycin and can be represented by the formula:

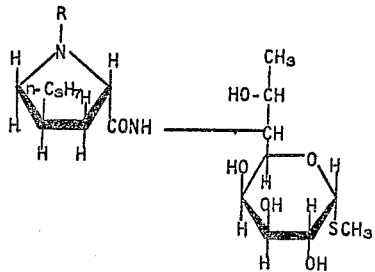

wherein R is hydrogen. By methylation with methyl iodide the N-hydrogen is replaced by methyl and lincomycin results.

It has been further found that by alkylating lincomycin D with higher alkyl halides, the corresponding analogues of lincomycin are obtained. Thus, alkylation with ethyl iodide yields N-ethyllincomycin D, a new compound having valuable antibiotic properties. Similarly by alkylating with cycloalkyl iodides or aralkyl iodides, the corresponding N-cycloalkyllincomycin D and N-aralkyllincomycin D are obtained. Like products can also be obtained according to the invention by reacting lincomycin D with an oxo compound and hydrogenating the resulting product. Thus, the processes of the invention not only convert lincomycin D to lincomycin but also to an entirely new class of lincomycin analogues in which R in Formula I above is an alkyl of at least two carbon atoms, cycloalkyl, or aralkyl.

The novel N-alkyllincomycin D can be formed by reacting lincomycin D with an alkyl iodide; the novel cycloalkyl lincomycin D can be formed by reacting lincomycin D with a cycloalkyl or (cycloalkyl)alkyl iodide; and the novel N-aralkyllincomycin D by reacting lincomycin D with an aralkyl iodide. Suitable alkyl iodides for this purpose are ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl iodides and the isomeric forms thereof. Suitable cycloalkyl and (cycloalkyl)alkyl iodides include cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl iodide. Suitable aralkyl iodides include benzyl iodide, phenethyl iodide, 1-, 2- and 3-phenylpropyl iodide, and 1- and 2-naphthylmethyl iodide. The reaction can be conducted, conveniently, at room temperature, advantageously, in the presence of an inert liquid diluent, for example, an alcohol or halogenated hydrocarbon solvent (methylene chloride is preferred). The proportions of reactants can be varied; however, it is desirable to employ at least an equimolar proportion of the reactants and up to an excess of about 15 fold of the iodide. Such excess can serve as a solvent for the reactants, thus favoring the reaction while not substantially complicating the isolation of N-substituted lincomycin D. The reaction is usually completed in from a few minutes to several hours.

N-substituted lincomycin D can be isolated from the reaction mixture by first concentrating the mixture, dissolving the residue in water, adjusting the pH to 10 and then extracting with halogenated hydrocarbon solvent (methylene chloride is preferred). The organic extract is concentrated to dryness and the residue dissolved in alcoholic hydrogen chloride. This solution is then mixed with a small amount of a lower alkanone in ether to precipitate N-substituted lincomycin D as the hydrochloride.

Alternatively the novel compounds of the invention can be prepared by reacting lincomycin D with an aldehyde or ketone, that is to say, with saturated aliphatic, cycloaliphatic, or araliphatic oxo compound, and hydrogenating the resulting product. The hydrogenation can be effected with palladium or platinum as the catalyst or any hydrogenating catalyst effective to saturate a double bond. Suitable aldehydes for this purpose are acetaldehyde, propanal, butanal, acetone, isobutyl methyl ketone, benzaldehyde, phenylacetaldehyde, 2- and 3-phenylpropanal, 2- and 3-cyclopentylpropanal, cyclohexylmethanol, cyclohexanone, 4-methylcyclohexanone, acetophenone, and the like.

Various acid-addition salts of the free base form can be made by neutralizing the free base with the appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicyclic, 3-phenylsalicyclic, 5-phenylsalicyclic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

The acid-addition salts can be used for the same purposes as the free base or they can be employed to upgrade the same. For example, the antibiotic can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-imiscible solvents before regenerating the free base form by treatment of the thus-extracted acid solution with alkali or converting to another salt by metathesis.

The novel compounds can be used as a buffer or as an antacid. They react with isocyanates to form urethanes and can be used to modify polyurethane resins. The long chain N-alkyllincomycins D's, in the salt form, i.e., from 8 carbon atoms up, have surface active properties and can be used as wetting and emulsifying agents.

The N-ethylation of lincomycin D has provided an antibiotic having unexpected activity against Gram-negative microorganisms. Lincomycin, the original antibiotic of the series, is primarily active against Gram-positive microorganisms. Lincomycin D, which has been shown to be N-demethyllincomycin, has the same antibacterial spectrum as lincomycin, though in a lesser degree. N-ethyllincomycin D differs unexpectedly by not only having activity comparable to lincomycin against Gram-positive microorganisms, but also significant activity against Gram-negative microorganisms, particularly *Klebsiella pneumoniae*. A comparison of these activities was run on a tube dilution assay using BHI broth (Brian Heart Infusion, Difco, Detroit, Michigan). Assay tubes (18 x 150 mm.) were prepared in the customary manner set out in Snell, E. E., Vitamin Methods, vol. I, Academic Press, Inc., New York, 1950, page 327. Test organisms grown for 18 hours at 37° C. were used to inoculate the test medium at a dilution of 1–40,000. The comparative antibacterial spectrum of lincomycin, lincomycin D, and N-ethyllincomycin D is shown in the following table:

| Test Organism | M.I.C.[1] (mcg./ml.) | | |
|---|---|---|---|
| | Lincomycin | N-ethyl Lincomycin | Lincomycin D |
| Gram Positive: | | | |
| Staphylococcus aureus UC 76 | 0.4 | 0.8 | 6.0 |
| Staphylococcus aureus UC 552 | 0.8 | 0.8 | 12.0 |
| Staphylococcus aureus UC 771 | 0.8 | 0.8 | |
| Staphylococcus aureus UC 70 | 0.4 | 0.4 | 3.0 |
| Staphylococcus hemolyticus | 0.8 | 0.8 | 3.0 |
| Streptococcus faecalis | 0.8 | 0.8 | 1.6 |
| Bacillus subtilis | 25 | 100 | 100 |
| Gram Negative: | | | |
| Escherichia coli | >100 | 100 | >100 |
| Proteus vulgaris | >100 | >100 | >100 |
| Klebsiella pneumoniae | 100 | 25 | >100 |
| Salmonella schottmuelleri | >100 | 50 | >100 |
| Pseudomonas aeruginosa | >100 | >100 | >100 |

[1] M.I.C.=Minimum inhibitory concentration.
NOTE: The UC prefix refers to The Upjohn Culture Collection. These organisms are available from The Upjohn Company upon request.

N-ethyllincomycin D can be used for the same purposes as lincomycin. Moreover, since it is a broad spectrum antibiotic, whereas lincomycin and lincomycin D are not, it can be employed in many environments where broad spectrum antibiotics are useful. N-ethyllincomycin D can be impregnated into pads used in an evaporative cooler for water as described in U.S. Patent 3,126,428 to prevent multiplication of bacteria, thus eliminating the odor problem in cool air caused by the bacteria. Further, the novel compound of the invention can be used to wash and sterilize excised tumors from rats as described in U.S. Patent 3,095,418. Also, it can be used to control the bacterial growth at the site where oysters are treated to produce cultured pearls. This then promotes healing, and permits growth of the bag that protects the pearl during its three to five year growth.

The following examples are illustrative of the processes and products of the present invention but are not to be construed as limiting.

PREPARATION OF LINCOMYCIN D

A. *Fermentation*

A soil slant of *Streptomyces lincolnensis* var. *lincolnensis*, NRRL 2936, was used to inoculate a series of 500-ml. Erlenmeyer flasks each containing 100 ml. of sterile preseed medium consisting of the following ingredients:

| | Gm. |
|---|---|
| Yeastolac [1] | 10 |
| Glucose monohydrate | 10 |
| N-Z Amine B [2] | 5 |
| Tap water, q.s. 1 liter. | |

[1] Yeastolac is a protein hydrolyzate of yeast cells.
[2] N-Z Amine B is Sheffield's enzymatic digest casein.

The preseed medium post sterilization pH was 7.3. The preseed was grown for 2 days at 28° C. on a Gump rotary shaker operating at 250 r.p.m. with a 2½ inch stroke.

Pressed inoculum (600 ml.), described above (was used to inoculate a 400-liter seed tank containing 250 liters of the following sterile seed medium.

| | Gm. |
|---|---|
| Glucose monohydrate | 10 |
| Yeast | 10 |
| Distillers' solubles | 5 |
| Sodium chloride | 4 |
| Tap water, q.s. 1 liter. | |

Adjust pH to 7–7.2 with a 50% solution of sodium hydroxide, then add one gram/liter $CaCO_3$ and 2 ml./liter lard oil. Sterilize for 30 minutes at 121° C.

The seed inoculum was grown for 48 hours at a temperature of 28° C., aeration rate of 100 standard liters/min., and agitated at a rate of 280 r.p.m.

A 5% inoculum of the seed described above (12.5 liters) was used to inoculate a 400-liter fermentation tank containing 250 liters of the following sterile fermentation medium:

| | | |
|---|---|---|
| Glucose monohydrate | gm | 15 |
| Starch | gm | 40 |
| Molasses | gm | 20 |
| Wilson's Peptone Liquor No. 159 [1] | gm | 10 |
| Corn steep liquor | gm | 20 |
| Calcium carbonate | gm | 8 |
| Lard oil | ml | 5 |
| Tap water, q.s. 1 liter. | | |

[1] Wilson's Peptone Liquor No. 159 is a preparation of enzymatically hydrolyzed proteins from animal origin.

Before sterilization, the pH was adjusted to 7.2 with a 50% solution of sodium hydroxide.

Two grams/liter of MTL was fed into the above fermentation at 48 hours. (In similar fermentations, levels of MTL as high as 8 grams/liter were fed to produce lincomycin D.)

The culture was grown for 90 hours at a temperature of 28° C., aeration rate of 200 standard liters per minute, and agitated at a rate of 280 r.p.m. The preharvest whole broth assay against *S. lutea* was 204 mcg./gm.

The assay against *Sarcina lutea* is conducted on agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism.

B. *Recovery*

Whole broth (35 liters) from a lincomycin D fermentation was filtered at harvest pH using 4% diatomaceous earth as filter aid. The filtrate was mixed for 30 min. with 5% activated carbon and then filtered using 5% diatomaceous earth as a filter aid. The carbon cake was washed successively with water and 20% aqueous acetone, and eluted once with 70% aqueous acetone, and twice with 90% aqueous acetone. The three acetone eluates (one 70% and two 90%) were combined, concentrated to an aqueous and freeze-dried to give 121.7 g. of Preparation No. 1 which contained lincomycin and lincomycin D. The carbon cake remaining after the acetone extractions was slurried with 1-butanol, acetone, and water (3:3:2) and filtered. The mother liquor was concentrated to an aqueous and freeze-dried to give 9 grams of Preparation No. 2 which contained lincomycin and lincomycin D. Parts of Preparations 1 and 2, 112 and 6 grams, respectively, were combined and dissolved in 400 ml. of water. The pH of the solution was adjusted to 10 by the addition of 11 ml. of 5 N aqueous sodium hydroxide. This solution was then extracted with 500 ml. of Skellysolve B (isomeric hexanes), and the extract discarded. The remaining aqueous solution (425 ml.) was then extracted 4 times with 250 ml. portions of methylene chloride. The pooled methylene chloride extracts (950 ml.) were concentrated to dryness to yield 4.5 g. of Preparation A which contained only lincomycin. The spent aqueous solution was extracted five times with 250 ml. portions of n-butyl alcohol. The combined butanol extract was washed with water and then concentrated to an aqueous solution and freeze-dried. This preparation was then dissolved in a solution containing 20 ml. of absolute methanol and 29 ml. of 1 N methanolic hydrogen chloride. This solution was mixed with 500 ml. of ethyl ether and the precipitate which formed was isolated by filtration and dissolved in water. The aqueous solution was freeze-dried to a residue, Preparation B, which contained lincomycin and lincomycin D.

C. *Counter current distribution*

Preparation B was dissolved in 100 ml. of the lower phase of a solvent system consisting of equal volumes of n-butyl alcohol and water. The solution was mixed with an equal volume of the upper phase of the above-mentioned system, and transferred to an all-glass, Craig counter current distribution (10 ml. per phase) apparatus. After 930 transfers the distribution was analyzed by solids determination and thin-layer chromatography. Analysis by thin-layer chromatography showed that tubes 104–170 contained predominantly lincomycin D. These tubes were pooled and concentrated in vacuo (approximately 80 ml.) at which time crystalline lincomycin D (200 mg.) precipitated. The filtrate was concentrated further to a volume of 50 ml. and additional crystalline lincomycin D which precipitated was isolated by filtration; yield 200 mg. These two crude crystalline preparations were combined (400 mg.) and dissolved in 17 ml. of water. On the addition of 60 ml. of acetone to this solution, high purity crystalline lincomycin D in the form of colorless long feathery crystals precipitated. The crystals were isolated by filtration and dried; yield 170 mg.

The methyl thiolincosaminide used above was prepared as follows:

A solution of 4 g. of lincomycin in 20 ml. of hydrazine hydrate (98–100%) was refluxed for 21 hours. The excess hydrazine hydrate was distilled off in vacuo under nitrogen, while heating on the steam bath, to leave a pasty mass of crystals. The mass was cooled, acetonitrile was added, and the mixture was stirred until the paste was dispersed and the crystals suspended. The crystals were collected, washed with acetonitrile and with ether. The yield of white, crystalline methyl thiolincosaminide after drying in vacuo at room temperature was 2.1 g. (84%). Recrystallization was accomplished by dissolving the substance in hot dimethylformamide and adding an equal volume of ethylene glycol dimethyl ether.

EXAMPLE 1

N-*ethyllincomycin* D

A. LINCOMYCIN D FREE BASE

Lincomycin D hydrochloride, 300 mg., was dissolved in 50 ml. of water. The pH of the solution was adjusted to 9.4 by using an anion exchange resin in the hydroxide form. The resin was obtained by chloromethylating by the procedure given on pages 88 and 97 of Kunin, Ion Exchange Resins, 2nd. ed. [1958], John Wiley & Sons, Inc., polystyrene cross-linked, if desired, with divinylbenzene, prepared by the procedure given on page 84 of Kunin, supra, and quaternizing with trimethylamine or dimethylethanolamine, by the procedure given on page 97 of Kunin, supra. The alkaline solution was then freeze-dried to give lincomycin D free base.

B. ETHYLATION OF LINCOMYLIN D

Lincomycin D free base from Part A above was dissolved in 20 ml. of methylene chloride and 3 ml. of methanol. After 3 ml. of ethyl iodide was added, the mixture was allowed to stand at room temperature for 2 hours at which time 5 ml. of ethyl iodide was added. The reaction mixture was held at 40° C. for 3 hours, and then room temperature overnight after which it was concentrated to dryness. The residue was dissolved in 30 ml. of water, the pH adjusted to 10.0 with 1 N aqueous sodium hydroxide, and the alkaline solution then extracted three times with methylene chloride. The methylene chloride extracts were concentrated to dryness and the residue dissolved in methanolic hydrogen chloride. This solution was mixed with 3 ml. of acetone and 100 ml. of ether to precipitate 34.4 mg. of N-ethyllincomycin D hydrochloride which was recovered by filtration and dried.

EXAMPLE 2

N-*ethyllincomycin* D *hydrochloride*

A mixture composed of lincomycin D hydrochloride (1.5 g., 0.00365 mole), acetaldehyde (.6 g., 0.0136 mole), water (5 ml.), methanol (150 ml.) and 30 % Pd./C. catalyst (0.7 g.) was hydrogenated in a Parr hydrogenator. After shaking in a hydrogen atmosphere at 25° for 2½ hrs., the reaction mixture was filtered and the filtrate evaporated to dryness under vacuum. The crude solid residue was analyzed by thin-layer chromatography on silica gel in a methanol-chloroform system (1:4). This chromatogram indicated that the crude product consisted almost entirely of one material with an $R_f$ very slightly greater than that of lincomycin. The crude product was dissolved in 50 ml. of water, the pH adjusted to 11 with dilute sodium hydroxide and this solution extracted well with methylene chloride. The methylene chloride phase was evaporated to dryness, the residue dissolved in acetone and a slight excess of etheral hydrochloric acid added. The precipitate which formed was collected immediately via filtration, washed with ether and dried; yield, 400 mg. This product was identical with that obtained in Example 1, Part B.

*Analysis.*—Calcd.: $C_{19}H_{37}ClN_2O_6S$: C, 49.93; H, 8.16; N, 6.13; S, 7.01; Cl, 7.76. Found: C, 47.77; H, 8.13; N, 6.15; S, 6.45; Cl, 7.36.

EXAMPLE 3

N-*isopropyllincomycin* D *hydrochloride*

By substituting the acetaldehyde of Example 2 by acetone, N-isopropyllincomycin D hydrochloride was obtained.

*Analysis.*—Calcd.: C, 50.99; H, 8.35; N, 5.95; S, 6.81; Cl, 7.53. Found: C, 50.44; H, 8.07; N, 5.38; S,    ; Cl, 7.32.

EXAMPLE 4

N-(3-*phenylpropyl*)*lincomycin* D *hydrochloride*

By substituting the acetaldehyde of Example 2 by 3-phenylpropanal, N-(3-phenylpropyl)lincomycin D hydrochloride was obtained.

*Analysis.*—Calcd.: C, 57.07; H, 7.93; N, 5.12; S, 5.86; Cl, 6.48. Found: C, 55.35; H, 8.28; N, 5.13; S, 5.76; Cl, 6.21.

EXAMPLE 5

N-*propyllincomycin* D *hydrochloride*

By substituting the acetaldehyde of Example 2 by propanal, N-propyllincomycin D hydrochloride was obtained.

*Analysis.*—Calcd.: C, 50.99; H, 8.35; N, 5.95; S, 6.81; Cl, 7.53. Found: C, 50.61; H, 8.68; N, 5.72; S, 6.60; Cl, 7.57.

EXAMPLE 6

By substituting the acetaldehyde, of Example 2 by the appropriate oxo compound, for example, propionaldehyde, acetone, butyraldehyde, isobutyl methyl ketone (4-methyl-2-pentanone), benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexanone, the corresponding N-propyl, N-isopropyl, N-butyl, N-4-methyl-2-pentyl, N-benzyl, N-phenethyl, N-3-phenylpropyl, N-1-phenylethyl, N-1-phenylpropyl, N-1-phenylbutyl, N-3-methyl-4-phenyl-2-butyl, N-2-methyl-5-phenyl-3-pentyl, N-3-cyclopentylpropyl, N-2-cyohexylethyl, N-cycloheptylmethyl, N-2-(2,2-dimethylcyclopropyl)ethyl, N-1-(2,2-dimethylcyclopropyl)ethyl, N-1-cyclopentylethyl, N-1-cyclobutylethyl, N-cyclobutyl, N-cyclohexyl, and N-4-methylcyclohexyl lincomycin D are obtained.

EXAMPLE 7

By substituting the ethyl iodide in Example 1 by the several iodides listed above, there are obtained N-propyl, N-butyl, N-pentyl, N-hexyl, N-heptyl, N-octyl, N-nonyl, N-decyl, N-undecyl, N-dodecyl, N-tridecyl N-tetradecyl, N-pentadecyl, N-octadecyl, N-nonadecyl, and N-eicosyl lincomycin D; N-cyclopropyl, N-cyclobutyl, N-cyclopentyl, N-cyclohexyl, N-cycloheptyl, N-cyclooctyl, N-(2-methylcyclopentyl)-, N-(2,3-dimethylcyclobutyl)-, N-(4-methylcyclohexyl)-, and N-(1, 2- and 3-cyclopentylpropyl)lincomycin D; and N-benzyl, N-phenethyl-, N-(1- 2- and 3-phenylpropyl)-, and N-(1- and 2-naphthylmethyl) lincomycin D.

We claim:

1. A member of the group consisting of N-ethyllincomycin D [a compound of claim 3 wherein R is ethyl] and the acid addition salts thereof.
2. N-ethyllincomycin D hydrochloride.
3. N-(3-phenylpropyl)lincomycin D hydrochloride.

References Cited

UNITED STATES PATENTS

| | | | |
|---|---|---|---|
| 3,086,912 | 4/1963 | Bergy et al. | 260—210 |
| 3,152,115 | 10/1964 | Morel et al. | 260—210 |

OTHER REFERENCES

Migrdichian: "Organic Synthesis," vol. I, 1957, pp. 468, 469, 472, 475, and 490, Reinhold Publishing Corp., New York, N.Y.

LEWIS GOTTS, *Primary Examiner.*

J. R. BROWN, *Assistant Examiner.*